July 6, 1965 A. WINTER IV, ET AL 3,193,079
ROTARY MARSHALLING MACHINE
Filed Dec. 10, 1962 3 Sheets-Sheet 1
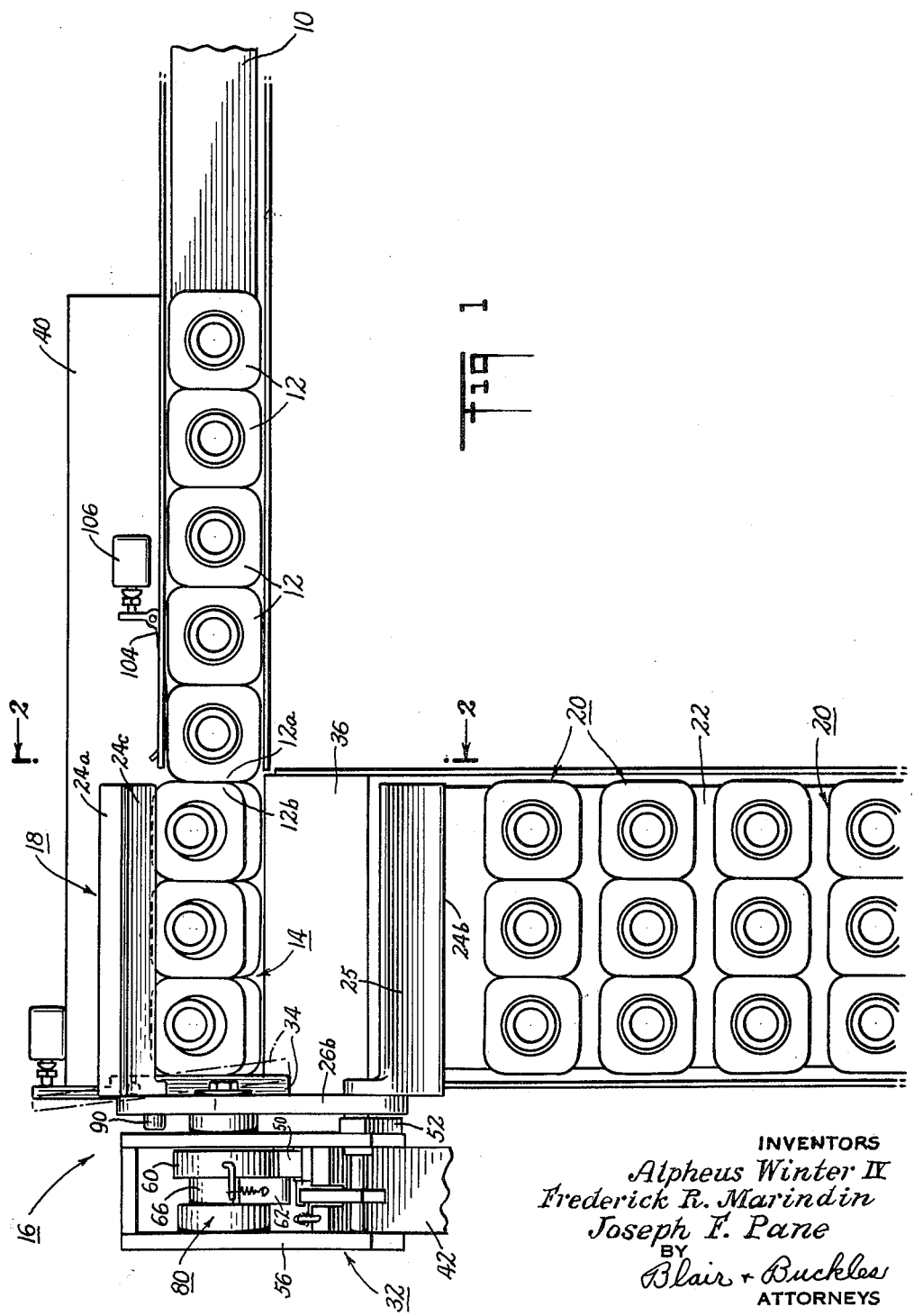
INVENTORS
Alpheus Winter IV
Frederick R. Marindin
Joseph F. Pane
BY
Blair + Buckles
ATTORNEYS

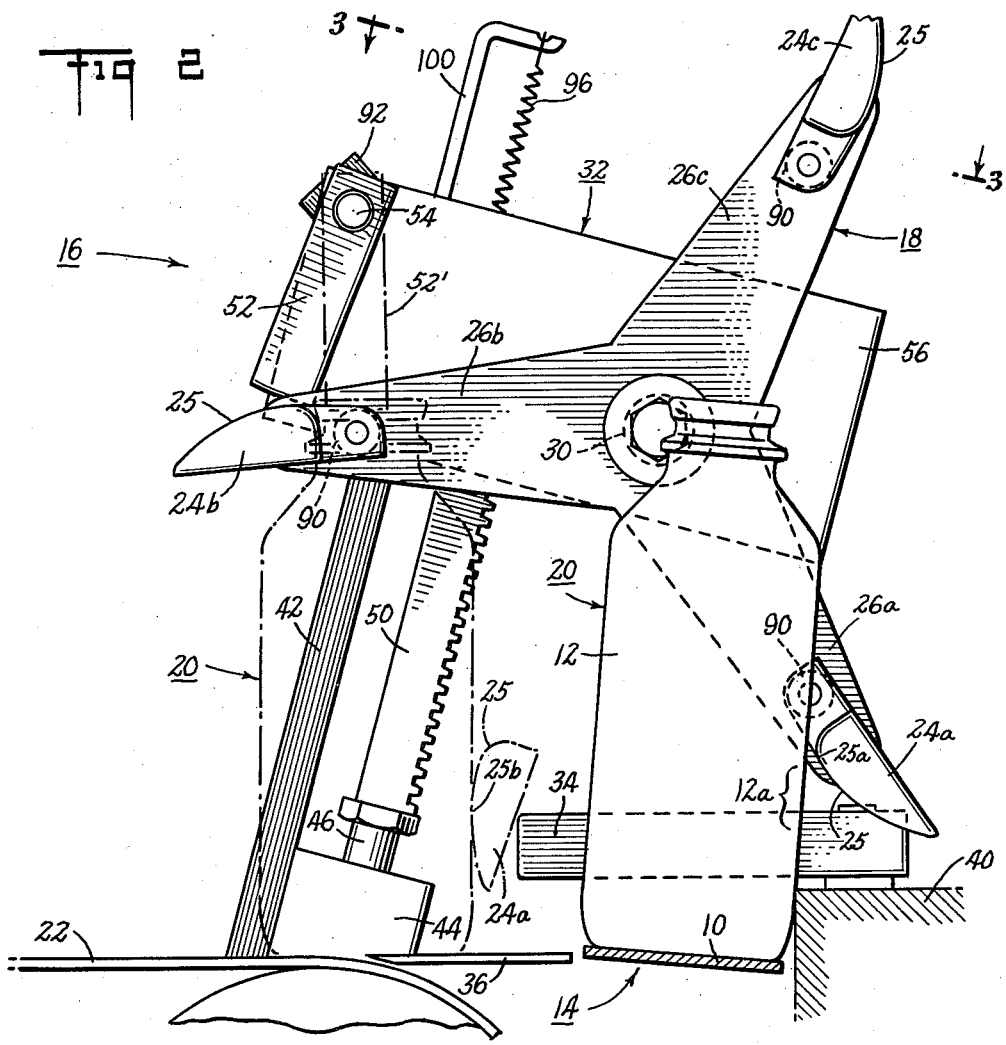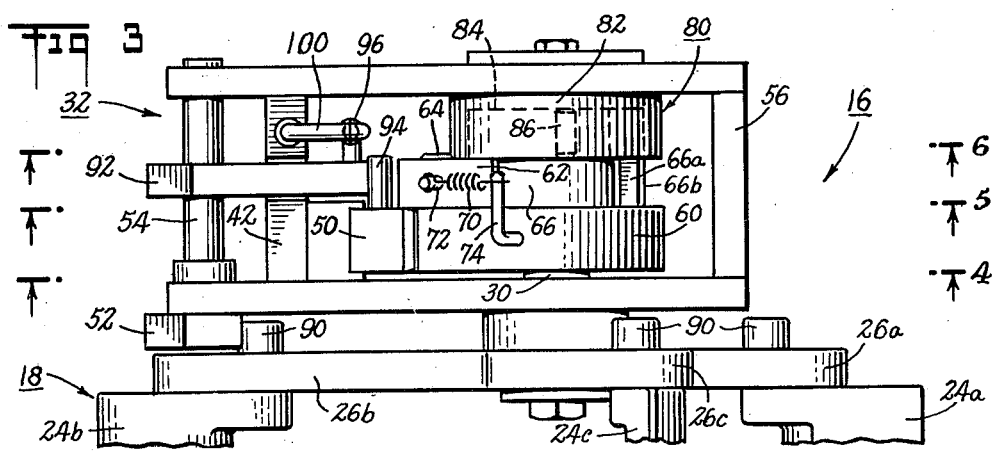

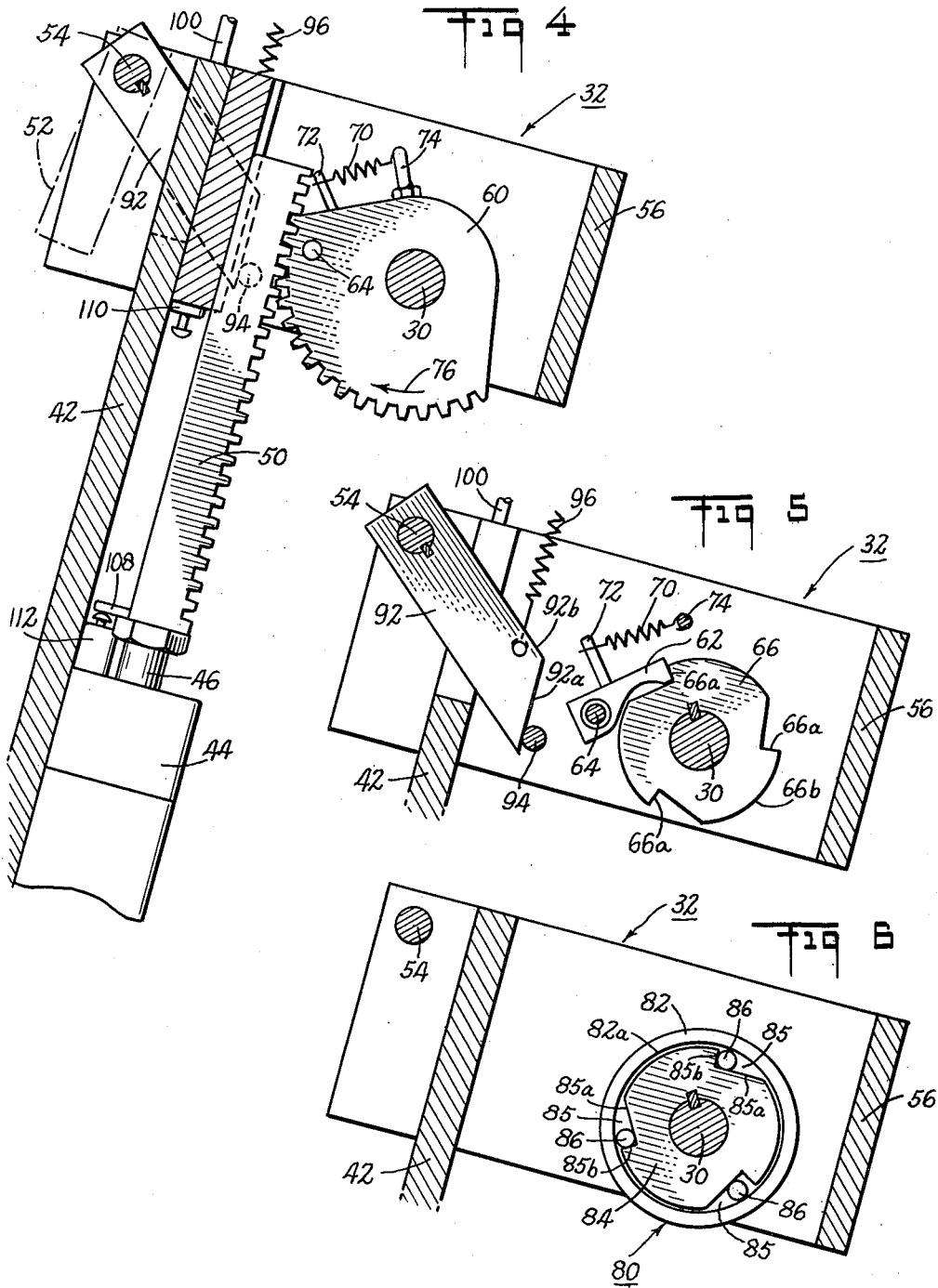

United States Patent Office 3,193,079
Patented July 6, 1965

3,193,079
ROTARY MARSHALLING MACHINE
Alpheus Winter IV, Fairfield, Conn., Frederick R. Marindin, Oyster Bay, N.Y., and Joseph F. Pane, Danbury, Conn., assignors to Windor Incorporated, Danbury, Conn.
Filed Dec. 10, 1962, Ser. No. 243,518
1 Claim. (Cl. 198—31)

This invention relates to apparatus for marshalling containers on a conveyor in groups. Specifically, the invention provides a novel rotary marshaller that transfers simultaneously a selected number of containers or the like from a single line or other feed conveyor to a processing or machine-feeding conveyor. The marshaller groups the containers on the machine-feeding conveyor at a substantially faster rate than heretofore possible and substantially eliminates damage to the containers. The latter feature is particularly important for marshalling milk bottles, which are relatively fragile.

The marshaller is constructed as detailed hereinafter to maintain substantially uniform the height at which it engages containers to transfer them in marshalled groups to the machine-feeding conveyor. In addition, the marshaller includes a novel drive and control mechanism.

In industrial operations, containers are often processed one at a time, such as during filling, capping or labelling. Thereafter, the containers are handled in groups, as for packaging. Marshalling apparatus is utilized to group the containers for the packaging or other subsequent operations. In food packing and dairy plants, for example, millions of jars and bottles must be delivered, filled, capped, and cartoned with gentle handling, for jamming, jarring impact or overturning of containers will result in costly spilling, breakage and shutdowns of production lines.

In one type of marshalling machine constructed according to prior techniques, a reciprocating pusher transfers containers from a single line conveyor with a horizontal motion across the single line conveyor. The pusher is then retracted to the start position, readying it to transfer the next group of containers. Since the pusher is retracted across the single line conveyor at the end of the transfer process, the containers must tbe fed to the marshaller intermittently, arriving only when the pusher is retracted. This requires additional mechanisms to repetitively interrupt the delivery of containers to the reciprocating marshalling machine.

A further disadvantage with prior reciprocating marshallers is that substantial time is lost in each transfer cycle during retraction of the pusher. To minimize this lost time, the reciprocating pusher is operated at maximum speed. However, since this increases the number of containers damaged during transfer, increasingly complex and precise drive apparatus is required to control the transfer operation. However, such drive apparatus is costly and often unreliable.

Accordingly, a principal object of this invention is to provide improved apparatus for marshalling containers.

Another object is to provide apparatus for marshalling containers without damaging or upsetting them.

Yet another object of the invention is to provide apparatus of the foregoing type that marshalls containers more rapidly than prior machines of this type.

A further object of the invention is to provide efficient drive and control equipment for a rotary marshalling machine.

Still another object of the invention is to provide low cost marshalling apparatus of the above character that is simply constructed and requires minimum maintenance.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claim.

For a fuller understanding of the nature and objects of the invention, reference should be had to the following detailed description taken in connection with the accompanying drawings, in which:

FIGURE 1 is a top plan view of a marshalling system embodying the present invention;

FIGURE 2 is a side elevation view of the marshalling apparatus in FIGURE 1, taken along line 2—2 of FIGURE 1;

FIGURE 3 is a top plan view of a portion of the drive and control mechanism for the marshalling apparatus of FIGURE 2, taken along line 3—3 of FIGURE 2 and embodying the invention;

FIGURE 4 is a detailed side elevation view, partly in section, of the marshalling machine drive and control mechanism, taken along line 4—4 of FIGURE 3;

FIGURE 5 is a detailed side elevation view, partly in section, of the marshalling machine drive and control mechanism, taken along line 5—5 of FIGURE 3; and FIGURE 6 is a detailed side elevation view, partly in section, of the marshalling machine drive and control mechanism, taken along line 6—6 of FIGURE 3.

In the embodiment of the invention illustrated in the drawings a paddle wheel, having at least one paddle, is rotatably mounted above a single line conveyor at the point where articles are transferred to a machine-feeding conveyor from the single line conveyor. Rotation of the paddle wheel carries one paddle across the path of the single line conveyor, sweeping a group of containers from the single line conveyor to the machine feeding conveyor.

The paddles are not retracted across the ingle line conveyor back to a start position, but are revolved above it, and the rotary marshaller does not obstruct the path of the single line conveyor. Accordingly, containers can now be continuously delivered to the marshaller, thereby eliminating the need for devices to interrupt the delivery.

The container-transferring paddles are specially shaped, as detailed below, to maintain contact with substantially the same vertical zone or region of the containers during the transfer process, so that the containers are pushed at substantially the same height, to minimize upsetting them.

The paddle wheel is rotated by a novel drive mechanism that converts the reciprocating motion of a fluid operated, preferably pneumatic, piston to a unidirectional rotation.

More specifically, referring to FIGURE 1, a conventional single line conveyor 10 delivers containers 12, such as quart milk bottles, to a marshalling station generally indicated at 14. A rotary marshalling machine indicated generally at 16 successively tranfers groups 20 of containers to a conventional machine-feeding or other processing conveyor indicated at 22.

As best seen in FIGURES 1 and 2, the marshalling machine 16 incorporates a paddle wheel indicated generally at 18 having three paddles 24a, 24b and 24c secured to radial supports 26a, 26b and 26c, respectively. The paddle wheel 18 is secured on a shaft 30 for rotation with the shaft. A pneumatically operated paddle wheel drive and control mechanism generally indicated at 32, described below in detail, is actuated when a selected number of containers 12 are accumulated at the marshalling station 14. The actuated mechanism rotates the shaft 30 and paddle wheel 18 to carry the paddle shown in FIGURES 1 and 2 at 24a to the position of paddle 24b, transferring another group 20 of three containers from the single-line conveyor 10 to the machine-feeding conveyor 22.

Simultaneously, paddle 24c is carried to the position occupied in FIGURES 1 and 2 by the paddle 24a, ready to transfer another group 20 of containers 12 to the machine-feeding conveyor 22.

As soon as paddle 24a moves the group of three containers out of the line of containers on the single line conveyor 10, the next group of containers immediately advances to the marshalling station, ready to be transferred by paddle 24c. The time interval for transferring successive groups from single line conveyor 10 to machine-feeding conveyor 22 is thus reduced to a minimum, allowing the present machine to marshall containers at a rapid rate, and much faster than the reciprocating type employed in prior machines.

As best seen in FIGURES 1 and 2, a valve lever arm 34, described more fully hereinafter, extends across the single line conveyor 10 to interrupt the containers 12 advancing on the conveyor 10. The lever arm 34 thus halts the forward movement of the containers 12 and accumulates them at the marshalling station, below the paddle wheel 18 in the path of the paddles 24.

The feed conveyor 10 is canted, as shown in FIGURE 2, to prevent the containers accumulated at the marshalling station from wandering off the conveyor 10 on to the dead plate 36 and then being randomly pushed on to the processing conveyor 22. Specifically, the containers 12 slide "downhill" on the slippery, often lubricated, canted conveyor 10 and rest against a conveyor guide for 40 that maintains them in the proper position for transfer to the conveyor 22.

Still referring to FIGURE 2, a brace 42 supports the drive and control mechanism 32 above the conveyors 10 and 22. A pneumatic cylinder 44, fitted with a piston 46 that carries a toothed rack 50, furnishes the drive to rotate the paddle wheel 18.

The drive and control mechanism 32, viewed from above in FIGURE 3, is constructed with a frame 56 secured on the brace 42. The shaft 30 is rotatably mounted in the frame 56 and extends beyond it to support the paddle wheel 18. Referring now to FIGURES 3 and 4, the rack 50 engages a segmented gear 60 freely and rotatably mounted on the shaft 30. The reciprocating motion applied to the rack 50 by the piston 46 and cylinder 44 thus rotates the segmented gear 60 back and forth on the shaft 30.

As best seen in FIGURES 3, 4, and 5, a pawl 62 is rotatably carried on the segmented gear 60 by a pin 64. The pawl is constructed to engage the teeth 66a of a three-toothed ratchet wheel 66 keyed to the shaft 30. A spring 70, secured to the pawl 62 with a crank arm 72, urges the pawl 62 against the circumference 66b of the ratchet wheel 66. The other end of the spring 70 is carried on the segmented gear 60 with an elbow 74.

With this construction, upward movement of the rack 50 rotates the segmented gear 60 approximately 120° in the clockwise direction as indicated with the arrow 76 in FIGURE 4. The pawl 62, carried on the segmented gear 60 with its pressure urging means comprising elements 70, 72 and 74, engages a ratchet tooth 66a, rotating the ratchet wheel 66 and the shaft 30 in the clockwise direction until the rack 50 reaches the top of its excursion. The paddle wheel 18, secured on the shaft 30, is thus rotated to transfer containers from conveyor 10 to conveyor 22.

Downward movement of the rack 50, by retraction of the piston 46 within the cylinder 44, rotates the segmented gear 60 in the counter-clockwise direction, FIGURE 4. A one-way clutch, indicated at 80 in FIGURE 3 and described below, prevents the shaft 30 from being rotated backwards, counter-clockwise, by the returning gear 60. Thus the ratchet wheel 66 remains stationary while the returning segmented gear 60 carries the pawl 62 counter-clockwise over the ratchet wheel circumference 66b.

Thus each extension-retraction cycle of the piston-cylinder combination indexes the rack 50 and segmented gear 60 back and forth once, rotating the ratchet wheel 60 120° in the clockwise direction to turn the shaft 30 and the paddle wheel 18 through the same angle.

The one-way clutch 80 that prevents the shaft 30 from being rotated counter-clockwise when the rack moves down will now be explained with reference to FIGURES 3 and 6. A clutch housing 82 having a cylindrical inner surface 82a is mounted on the frame 56 with the surface 82a concentric with and radially spaced from the shaft 30. A radially wedging clutch plate 84 is keyed on the shaft 30 and disposed within the housing 82. The plate 84 is formed with three radially wedging recesses 85. A roller 86 is disposed in each recess 85, between the clutch plate 84 and the housing surface 82a.

As best seen in FIGURE 6, during clockwise rotation of the shaft 30 the clutch plate 84 is carried clockwise and the rollers 86 freely fit within the recesses 85, disposed against the recess step surfaces 85b. However, when the shaft 30 is urged to rotate in the counter-clockwise direction, the rollers 86 become wedged between the recess incline surfaces 85a and the housing surface 82a, preventing the plate 84 from rotating. Thus the shaft 30 is effectively prevented from rotating in the counter-clockwise direction and still allowed to rotate in the clockwise direction with substantially no frictional drag being imposed by the one-way clutch 80.

A further feature of the rotary marshalling machine is an overshoot stop that prevents the paddle wheel 18 from being rotated more than 120° with each indexing cycle of the rack and segmented gear. As best seen in FIGURES 3 and 4, the overshoot stop includes the arm 52, indicated with dashed lines in FIGURE 4, keyed to the shaft 54 for rotation to a stop position, indicated in FIGURE 2 with the arm 52' shown with dashed lines, where the arm interferes with one of three bumpers 90 (FIGURE 3) carried on the paddle wheel 18. The position of the stop arm 52 is controlled with a cam follower arm 92 disposed within the frame 56 and keyed to the shaft 54.

A cam 94, in the form of a short cylindrical stud as shown in FIGURES 3 and 5, projects at right angles from the rack 50 and bears against the surface 92a on the cam follower arm 92 both when the rack 50 is retracted and when it moves upward, rotating the gear 60 and the paddle wheel 18. After the piston 46 drives the rack 50 up sufficiently to rotate the paddle wheel 18 to carry one bumper 90 past the arm 52, the cam 94 no longer engages the surface 92a, allowing a spring 96 secured to arm 92 to revolve arms 92 and 52 and shaft 54 in the counter-clockwise direction, FIGURE 4. This carries the arm 52 into the stop position where it engages the next paddle wheel-mounted bumper 90, preventing the paddle wheel 18 from rotating further.

The mounting of the springg 96, best seen in FIGURES 2 and 3, is achieved with an L-shaped bracket 100 secured on the brace 42 and extending above the frame 56. The spring is tensioned between the bracket 100 and the arm 92.

Referring again to FIGURES 4 and 5, the overshoot stop is removed from the stop position during the descent of the rack 50, when the cam 94 engages the cam-follower surface 92b, rotating the shaft 54 and the arms 52 and 92 clockwise until the cam 94 again engages the surface 92a.

The above-described rotary marshaller is particularly suited for handling containers 12 such as quart milk bottles. It is well known that milk bottles are fairly fragile and have a relatively high center of gravity so that they are easily upset.

As best seen in FIGURE 2, each paddle 24 has a rounded, smoothly contoured container-contacting surface 25 that maintains contact with the containers 12 at a substantially constant height throughout the transfer operation. Specifically, each surface 25 is rounded so that the distance from the center of the shaft 30 to the surface portion in immediate contact with the containers 12 changes during the container-engaging rotary movement of the paddle wheel. This results in the paddles engaging the containers within a substantially narrow vertical segment, indicated in FIGURE 2 at 12a on the containers.

Thus, the paddle 24a initially contacts the containers 12 at the top of the segment 12a with the surface portion 25a.

The contact point of the paddle against the containers descends slightly until the paddle reaches the bottom of its arcuate path, and then remains substantially level during the remainder of the pushing action, as the containers are moved across the dead plate 36 on to the conveyor 22. The final region of contact between the surface 25 and the containers 12 is indicated as the surface portion 25b on the paddle 24a', shown in FIGURE 2 with dashed lines to indicate the position of the paddle 24a immediately prior to ceasing to engage the containers 12 as they are carried off by the conveyor 22.

The machine-feeding conveyor 22 preferably carries the containers 12 away with the same velocity that they were pushed by the paddles 24, to minimize upsetting the containers by an abrupt change in velocity. After a marshalled group 20 of containers reaches the machine feed conveyor 22, the grouped containers draw away from the transferring paddle, because as paddle climbs above the machine-feeding conveyor with further rotation of shaft 30, its component of velocity parallel to the feed direction of the conveyor 22 decreases, dropping below the velocity of the machine-feeding conveyor 22.

When the center of the shaft 30 is offset, as shown in FIGURE 2, from the vertical centerline of the containers 12 when they are against the guide bar 40, the paddles 24 initially contact the containers 12 at a higher point than without the offset. The high initial contact point tends to start the containers 12 moving toward the machine-feeding conveyor 22 wih a slight twist, i.e. the top of the container initially moves faster than its base. It has been observed that this small forward twist helps overcome the static friction between the containers indicated in FIGURE 1 at 12a and 12b.

In one example of this construction, for marshalling quart milk bottles, the center of the shaft 30 and paddle wheel 18 is 8⅛ inches above the surface of the conveyor 10 and is offset ⅜ inch toward the conveyor 20 from the vertical centerline of the milk bottles when they are against the guide bar 40.

The operation of the above-described rotary marshalling apparatus can be controlled with any number of well known devices. For example, lever arms 34 and 104, FIGURE 1, may each be connected with a pneumatic valve, such as the valve 106 coupled to arm 104, to sense when a group of containers 12 is accumulated on the conveyor 10 below the paddle wheel 18. The signals developed in response to deflection of these lever arms can be used to rotate the paddle wheel 18, as by operating the pneumatic cylinder 44.

With the arrangement of FIGURE 1, after three containers are accumulated under the paddle wheel in the path of the paddles, the next container maintains arm 104 depressed. Thus, depression of both arms 34 and 104 indicates that a group of three containers is ready for transferring to the conveyor 22. In this manner the rotary marshalling apparatus senses the number of containers under the paddle wheel 18, to ensure that the number of containers in each group 20 is the same.

In addition, an actuator 108, shown in FIGURE 4, may be mounted on the rack 50, and pneumatic valves 110 and 112 mounted on the brace 42 in alignment with actuator 108. With this arrangement, when the rack 50 is retracted by the piston 46 as far as desired, the actuator 108 operates the valve 112 to control the pneumatic cylinder 44, so that the piston is not withdrawn further. Similarly, the actuator 108 operates the valve 110 when the rack is extended as far as desired to control the cylinder and prevent further extension of the piston 46.

In summary, described above is a novel rotary marshalling machine having a paddle wheel that rotates above a single line conveyor at a point where a machine-feeding conveyor runs from it. Rotation of the paddle wheel carries one of its paddles across the single line conveyor, transferring a group of containers on the single line conveyor to the machine-feeding conveyor. The transfer operation is achieved with maximum speed and substantially without interrupting the continuous delivery of containers to the marshalling station where the paddle wheel is located. For example, in one installation, 16 more milk bottles are marshalled each minute with the present rotary marshaller than could be handled with a prior art, linearly reciprocating, pusher type marshaller. This is a 10% increase over the capacity of the prior art machine.

The paddle wheel, and particularly its paddles, are constructed as described hereinabove to move the containers from one conveyor to the other with a motion that substantially eliminates upsetting the containers. This is achieved by having the paddles contact the containers at a substantially uniform height throughout the transfer operation.

The paddle wheel is precisely controlled for rapid rotation through a preselected arc, using a novel, low cost mechanism that converts a linearly reciprocating, or indexing, motion to a uni-directional rotation through a selected angle.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and secured by Letters Patent is:

Rotary marshalling apparatus for transferring containers in groups from a single-line conveyor to a machine feeding conveyor running from, and at right angles to said single-line conveyor, said apparatus comprising in combination, a paddle wheel having three uniformly spaced radially extending supports; an axially extending paddle secured to each of said supports, each of said paddles having a smoothly contoured container-engaging surface that engages a relatively narrow vertical portion of the containers during movement of the paddle through the arc of its container-contacting movement; a frame mounting said paddle wheel above the single-line conveyor at the place where the machine feeding conveyor runs therefrom, said paddle wheel being mounted for rotation about an axis parallel to the feed direction of the single-line conveyor; a guide bar disposed adjacent the side of the single-line conveyor remote from the machine feeding conveyor along the length of the single-line conveyor, said single-line conveyor being canted along its length adjacent said guide bar so that containers slide down the canted conveyor against said guide bar; container sensing means producing a signal responsive to the pressure of containers beneath said paddle wheel; a selectively operated paddle wheel stop, arresting the rotation of said paddle wheel as one paddle transfers the containers onto the machine feeding conveyor and as the next paddle arrives adjacent the single-line conveyor behind the next succeeding group of containers; and a drive mechanism receiving said signal and coupled to rotate said paddle wheel when a selected number of containers are beneath the paddle wheel to carry one of said paddles across said single-line conveyor to transfer the containers in groups from the single-line conveyor to the machine feeding conveyor.

References Cited by the Examiner

UNITED STATES PATENTS 757,723   4/04   VonCastens _____ 74—130 X (Other references on following page)

UNITED STATES PATENTS

| | | | |
|---|---|---|---|
| 1,039,202 | 9/12 | Smead | 198—21 X |
| 1,239,426 | 9/17 | Aufiero | 74—130 X |
| 1,276,164 | 8/18 | Black | 74—130 |
| 1,306,493 | 6/19 | Marsico | 74—130 X |
| 1,384,053 | 7/21 | DuPont | 74—130 X |
| 2,115,255 | 4/38 | David | 198—25 |
| 2,282,945 | 5/42 | Demarest | 74—130 |
| 2,609,911 | 9/52 | Davis | 198—21 X |
| 2,636,592 | 4/53 | Socke | 198—135 X |
| 2,848,909 | 8/58 | Hill | 74—822 |
| 2,968,973 | 1/61 | Mead | 74—822 |

FOREIGN PATENTS 641,978   2/37   Germany.

SAMUEL F. COLEMAN, *Primary Examiner.*

EDWARD A. SROKA, *Examiner.*